US010257416B2

(12) United States Patent
Kim et al.

(10) Patent No.: US 10,257,416 B2
(45) Date of Patent: Apr. 9, 2019

(54) APPARATUS AND METHOD FOR SETTING CAMERA

(71) Applicant: Samsung Electronics Co., Ltd., Suwon-si, Gyeonggi-do (KR)

(72) Inventors: Minyoung Kim, Seongnam-si (KR); Kenhyung Park, Suwon-si (KR); Changryong Heo, Suwon-si (KR); Taekyun Kim, Suwon-si (KR); Taeseon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 15/091,855

(22) Filed: Apr. 6, 2016

(65) Prior Publication Data

US 2016/0301866 A1    Oct. 13, 2016

(30) Foreign Application Priority Data

Apr. 10, 2015    (KR) ........................ 10-2015-0050733

(51) Int. Cl.
| | |
|---|---|
| *H04N 5/247* | (2006.01) |
| *H04N 7/18* | (2006.01) |
| *G10L 25/87* | (2013.01) |
| *G06T 19/00* | (2011.01) |
| *G02B 27/01* | (2006.01) |
| *H04N 5/232* | (2006.01) |

(Continued)

(52) U.S. Cl.
CPC ..... *H04N 5/23238* (2013.01); *G02B 27/0172* (2013.01); *G06T 19/006* (2013.01); *G10L 25/87* (2013.01); *H04N 5/2258* (2013.01); *H04N 5/23216* (2013.01); *H04N 5/23219* (2013.01); *H04N 5/23296* (2013.01); *H04N 5/247* (2013.01); *H04N 7/181* (2013.01); *G02B 2027/014* (2013.01); *G02B 2027/0138* (2013.01); *G10L 2025/783* (2013.01); *H04N 5/23203* (2013.01); *H04N 5/23245* (2013.01); *H04N 5/23251* (2013.01)

(58) Field of Classification Search
None
See application file for complete search history.

(56) References Cited

U.S. PATENT DOCUMENTS

| | | | |
|---|---|---|---|
| 4,511,886 A | 4/1985 | Rodriguez | |
| 6,005,610 A | 12/1999 | Pingali | |
| 6,084,556 A | 7/2000 | Zwern | |

(Continued)

FOREIGN PATENT DOCUMENTS

| | | |
|---|---|---|
| EP | 1876828 A1 | 1/2008 |
| EP | 2 747 414 A1 | 6/2014 |

(Continued)

OTHER PUBLICATIONS

European Search Report dated Feb. 26, 2019, issued in European Patent Application No. 18211991.7.

*Primary Examiner* — Reza Aghevli
(74) *Attorney, Agent, or Firm* — Jefferson IP Law, LLP

(57) ABSTRACT

A method for setting a camera in an electronic device including at least one photographing module is provided. The method includes detecting environment information through a sensor or a microphone, and changing setting information of at least one photographing module according to the detected environment information.

16 Claims, 13 Drawing Sheets

(51) Int. Cl.
*H04N 5/225* (2006.01)
*G10L 25/78* (2013.01)

(56) References Cited

U.S. PATENT DOCUMENTS

| | | | |
|---|---|---|---|
| 7,677,816 B2 * | 3/2010 | Aoki | H04N 7/181 |
| | | | 348/153 |
| RE42,690 E | 9/2011 | Aviv | |
| 8,908,078 B2 * | 12/2014 | Takanezawa | G08B 13/196 |
| | | | 348/152 |
| 9,736,580 B2 * | 8/2017 | Cahill | H04R 3/005 |
| 2003/0081504 A1 | 5/2003 | McCaskill | |
| 2004/0086186 A1 | 5/2004 | Kyusojin et al. | |
| 2004/0105006 A1 | 6/2004 | Lazo et al. | |
| 2005/0206726 A1 * | 9/2005 | Yoshida | H04N 7/181 |
| | | | 348/143 |
| 2008/0122949 A1 | 5/2008 | Kindborg et al. | |
| 2008/0298796 A1 * | 12/2008 | Kuberka | G03B 17/18 |
| | | | 396/263 |
| 2011/0285807 A1 | 11/2011 | Feng | |
| 2011/0310219 A1 | 12/2011 | Kim et al. | |
| 2012/0105579 A1 | 5/2012 | Jeon et al. | |
| 2012/0327225 A1 | 12/2012 | Barley et al. | |
| 2013/0194422 A1 | 8/2013 | Xia et al. | |
| 2014/0118488 A1 | 5/2014 | Steuart, III | |
| 2014/0132735 A1 | 5/2014 | Lee et al. | |
| 2014/0168432 A1 | 6/2014 | Nystrom | |
| 2014/0186049 A1 * | 7/2014 | Oshima | H04B 10/1143 |
| | | | 398/118 |
| 2014/0354561 A1 | 12/2014 | Kim et al. | |
| 2015/0043886 A1 | 2/2015 | Bang et al. | |
| 2015/0055937 A1 | 2/2015 | Van Hoff et al. | |
| 2015/0077416 A1 | 3/2015 | Villmer | |
| 2015/0116453 A1 | 4/2015 | Hirata et al. | |
| 2015/0116501 A1 * | 4/2015 | McCoy | H04N 5/23206 |
| | | | 348/169 |
| 2016/0277863 A1 * | 9/2016 | Cahill | H04R 3/005 |
| 2016/0286210 A1 * | 9/2016 | Border | G02B 27/0176 |

FOREIGN PATENT DOCUMENTS

| | | |
|---|---|---|
| EP | 2811737 A2 | 12/2014 |
| EP | 2860957 A1 | 4/2015 |
| GB | 2 259 213 A | 3/1993 |
| KR | 10-2012-0046452 A | 5/2012 |
| WO | 99/05867 A1 | 2/1999 |
| WO | 2013-186806 A1 | 12/2013 |

* cited by examiner

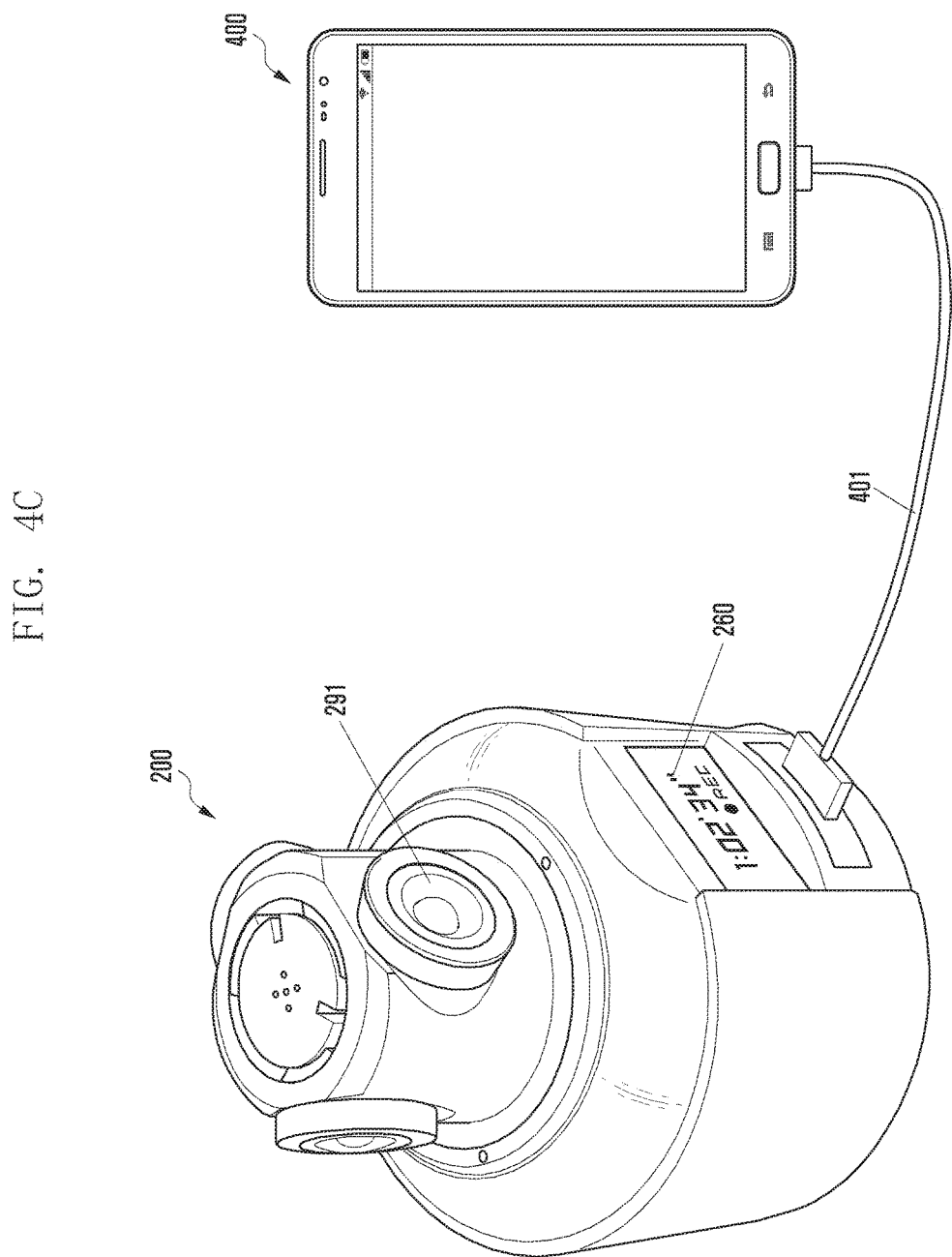

APPARATUS AND METHOD FOR SETTING CAMERA

CROSS-REFERENCE TO RELATED APPLICATION(S)

This application claims the benefit under 35 U.S.C. § 119(a) of a Korean patent application filed on Apr. 10, 2015 in the Korean Intellectual Property Office and assigned Serial number 10-2015-0050733, the entire disclosure of which is hereby incorporated by reference.

TECHNICAL FIELD

The present disclosure relates to an apparatus and a method for photographing in an electronic device including at least one lens.

BACKGROUND

According to recent developments in digital technologies, various electronic devices such as a mobile communication terminal, personal digital assistant (PDA), electronic organizer, smartphone, and tablet personal computer (PC) have been introduced that enable communication and processing of personal information. A mobile convergence level is developing so that such an electronic device no longer remains in its traditional area of operation and occupies the operational area of other terminals. As a typical example, the electronic device can include a communication function such as a voice communication and an image communication, message exchange function such as short message service (SMS)/multimedia message service (MMS) and email, electronic organizer function, photographing function, broadcast play function, video play function, music play function, internet function, messenger function, and social networking service (SNS) function.

Such an electronic device can perform an omnidirectional photographing in 360 degrees by using at least one lens and provide images taken in all the directions for a head-mounted display (HMD) device functionally connected to the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an apparatus and a method for setting a camera according to various embodiments of the present disclosure can photograph a specific area of all the subjects located in 360 degrees and change a photographing quality of the specific area.

In accordance with an aspect of the present disclosure, a method for setting a camera in an electronic device including at least one photographing module is provided. The method includes detecting environment information through a sensor or a microphone and changing setting information of at least one photographing module according to the detected environment information.

In accordance with another aspect of the present disclosure, an apparatus is provided. The apparatus includes at least one photographing module, a camera configuration selecting unit, and a camera processor. The at least one photographing module is configured to detect environment information through a sensor or a microphone and obtain an image through a lens. The camera configuration selecting unit is configured to determine each operation of the at least one photographing module according to the detected environment information and determine setting information including a photographing parameter. The camera processor is configured to control the at least one photographing module through a switching unit according to the setting information of the camera configuration selecting unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTIONS OF THE DRAWINGS

The above and other aspects, features, and advantages of certain embodiments of the present disclosure will be more apparent from the following description taken in conjunction with the accompanying drawings, in which:

FIG. 4C is a perspective drawing illustrating an electronic device and another electronic device connected electrically according to various embodiments of the present disclosure;

DETAILED DESCRIPTION

Figure 1:
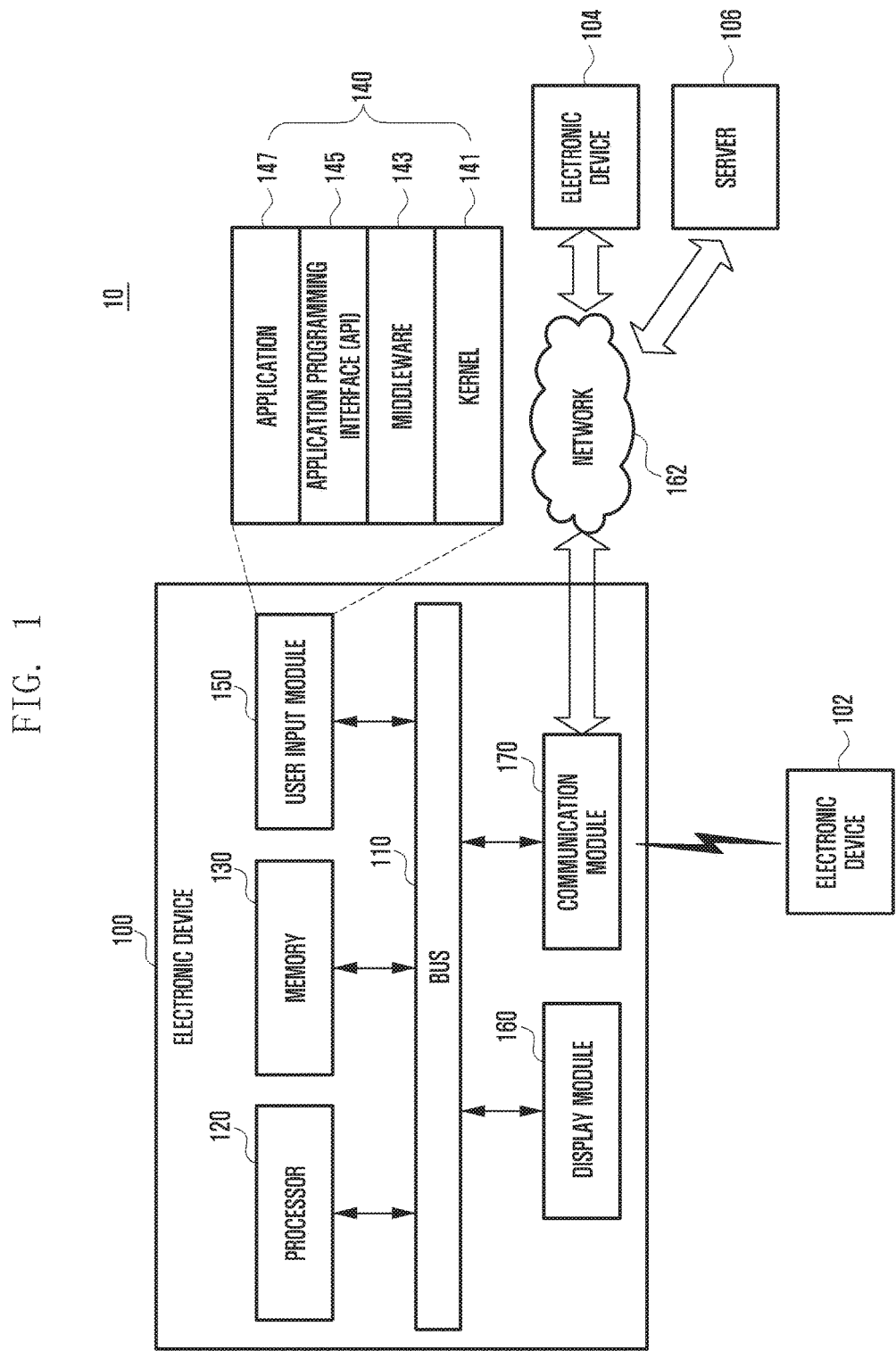
FIG. 1 is a block diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device (for example, a head-mounted-device (HMD) such as electronic glasses, electronic clothes, and electronic bracelet, an electronic necklace, an electronic appcessary, an electronic tattoo, and a smart watch.

According to various embodiments of the present disclosure, the electronic device may be a smart home appliance having a communication function. The smart home appliance may include at least one of a Television (TV), a digital video disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to various embodiments of the present disclosure, the electronic device may include at least one of various types of medical devices (for example, magnetic resonance angiography (MRA), MR imaging (MRI), computed tomography (CT), a scanner, an ultrasonic device and the like), a navigation device, a global positioning system (GPS) receiver, an event data recorder (EDR), a flight DR (FDR), a vehicle infotainment device, electronic equipment for a ship (for example, a navigation device for ship, a gyro compass and the like), avionics, a security device, a head unit for a vehicle, an industrial or home robot, an automatic teller machine (ATM) of financial institutions, and a point of sale (POS) device of shops.

According to various embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to an embodiment of the present disclosure, a screen of an electronic device may be split into at least two windows according to a predefined split manner and displayed through a display of an electronic device. The windows are defined as split windows. According to an embodiment of the present disclosure, the split windows are defined as windows displayed on a display of an electronic display not to be superposed one on another.

According to an embodiment of the present disclosure, a popup window is defined as a window displayed on a display of an electronic device to hide or to be superposed on a portion of a screen under execution.

According to an embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 10 including an electronic device 100 according to various embodiments of the present disclosure.

Referring to FIG. 1, the electronic device 100 includes a bus 110, a processor 120, a memory 130, a user input module 150, a display module 160 and a communication module 170.

The bus 110 may be a circuit connecting the above described components and transmitting communication (for example, a control message) between the above described components. The processor 120 receives commands from other components (for example, the memory 130, the user input module 150, the display module 160, the communication module 170) through the bus 110, analyzes the received commands, and executes calculation or data processing according to the analyzed commands. The memory 130 stores commands or data received from the processor 120 or other components (for example, the user input module 150, the display module 160, or the communication module 170) or generated by the processor 120 or other components. The memory 130 may include programming modules 140, for example, a kernel 141, middleware 143, an application programming interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 100 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The user input module 150 can receive, for example, a command and/or data from a user, and transfer the received command and/or data to the processor 120 and/or the memory 130 through the bus 110. The display module 160 can display an image, a video, and/or data to a user.

According to an embodiment of the present disclosure, the display module 160 may display a graphic user interface (GUI) image for interaction between the user and the electronic device 100. According to various embodiments of the present disclosure, the GUI image may include interface information to activate a function for correcting color of the image to be projected onto the screen. The interface information may be in the form of, for example, a button, a menu, or an icon. The communication module 170 connects communication between the electronic device 100 and the external device (for example, electronic device 102, 104 or server 106). For example, the communication module 170 may access a network 162 through wireless or wired communication to communicate with the external device. The wireless communication includes at least one of, for example, Wi-Fi, Bluetooth (BT), near field communication (NFC), a GPS, and cellular communication (for example, long-term evolution (LTE), LTE-advanced (LTE-A), code division multiple access (CDMA), wideband CDMA (WCDMA), universal mobile telecommunication system (UMTS), wireless broadband (WiBro) or global system for mobile communication (GSM)). The wired communication may include at least one of, for example, a universal serial bus (USB), a high definition multimedia interface (HDMI), recommended standard 232 (RS-232), and a plain old telephone service (POTS).

According to an embodiment of the present disclosure, the server 106 supports driving of the electronic device 100 by performing at least one operation (or function) implemented by the electronic device 100. For example, the server 106 may include a communication control server module that supports the communication module 170 implemented in the electronic device 100. For example, the communication control server module may include at least one of the components of the communication module 170 to perform (on behalf of) at least one operations performed by the communication module 170.

Figure 2:
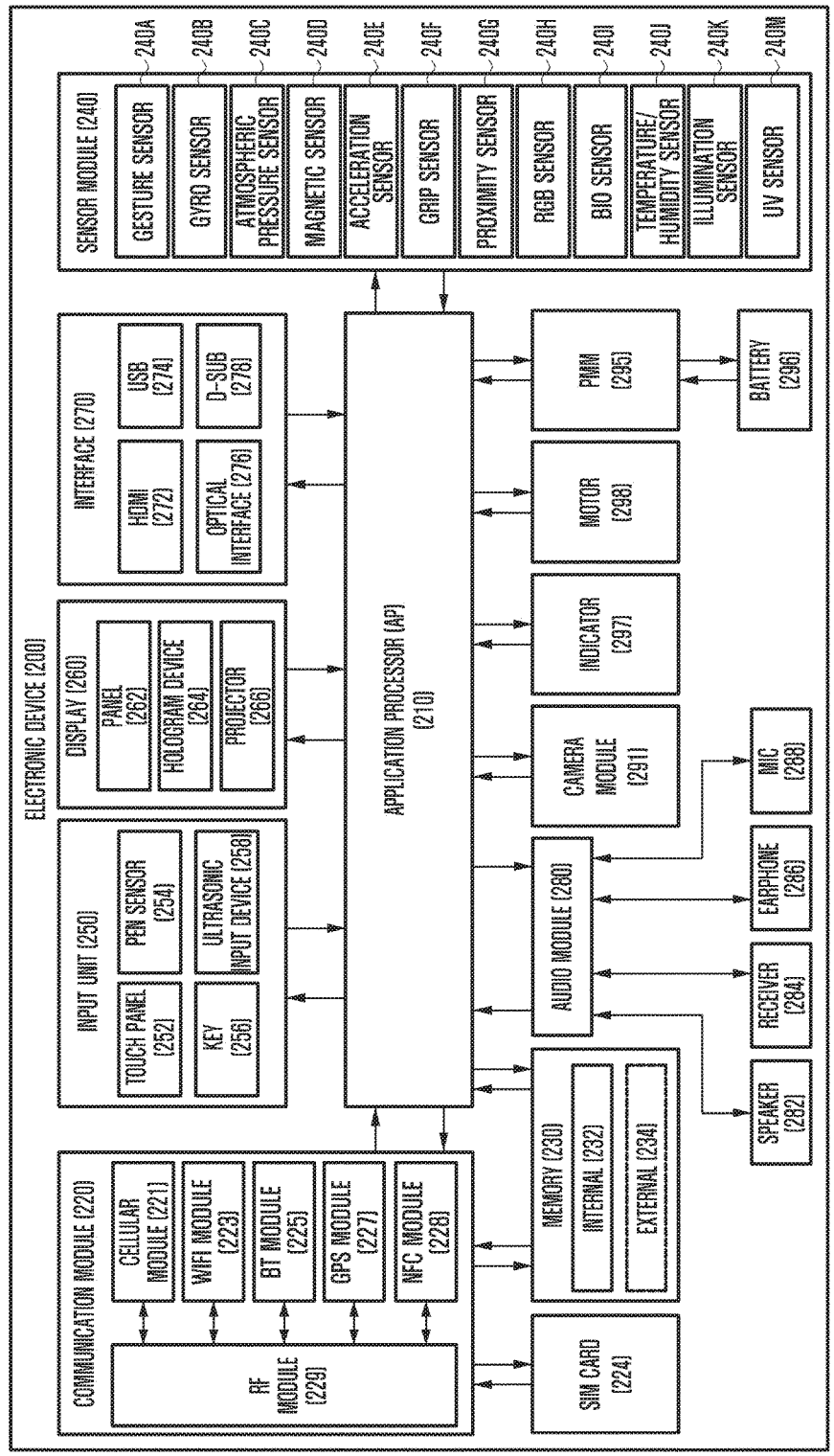
FIG. 2 is a block diagram illustrating a configuration of an electronic device according to various embodiments of the present disclosure.

FIG. 2 is a block diagram of an electronic device 200 according to various embodiments of the present disclosure. The electronic device 200 may configure, for example, a whole or a part of the electronic device 100 illustrated in FIG. 1.

Referring to FIG. 2, the electronic device 200 includes one or more application processors (APs) 210, a communication module 220, a subscriber identification module (SIM) card 224, a memory 230, a sensor module 240, an input device 250, a display 260, an interface 270, an audio module 280, a camera module 291, a power managing module (PMM) 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a system on chip (SoC). According to an embodiment of the present disclosure, the application processor 210 may further include a graphic processing unit (GPU) (not shown).

The communication module 220 (for example, communication module 170) transmits/receives data in communication between different electronic devices (for example, the electronic device 104 and the server 106) connected to the electronic device 200 (for example, electronic device 100) through a network. According to an embodiment of the present disclosure, the communication module 220 includes a cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an Internet service through a communication network (for example, LTE, LTE-A, CDMA, WCDMA, UMTS, WiBro, GSM or the like). Further, the cellular module 221 may distinguish and authenticate electronic devices within a communication network by using a subscriber identification module (for example, the SIM card 224). According to an embodiment of the present disclosure, the cellular module 221 performs at least some of the functions which can be provided by the AP 210. For example, the cellular module 221 may perform at least some of the multimedia control functions.

According to an embodiment of the present disclosure, the cellular module 221 may include a communication processor (CP). Further, the cellular module 221 may be implemented by, for example, an SoC.

According to an embodiment of the present disclosure, the AP 210 or the cellular module 221 (for example, CP) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are illustrated as blocks separate from each other in FIG. 8, at least some (for example, two or more) of the cellular module 221, the Wi-Fi module 223, the BT module 225, the GPS module 227, and the NFC module 228 may be included in one Integrated Chip (IC) or one IC package according to an embodiment of the present disclosure. For example, at least some (for example, the CP corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a power amp module (PAM), a frequency filter, a low noise amplifier (LNA) or the like. Further, the RF module 229 may further include a component for transmitting/receiving electronic waves over a free air space in wireless communication, for example, a conductor, a conducting wire, or the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment of the present disclosure.

The SIM card 224 is a card including a SIM and may be inserted into a slot formed in a particular portion of the electronic device. The SIM card 224 includes unique identification information (for example, integrated circuit card identifier (ICCID)) or subscriber information (for example, international mobile subscriber identity (IMSI)).

The memory 230 (for example, memory 130) may include an internal memory 232 or an external memory 234. The internal memory 232 may include, for example, at least one of a volatile memory (for example, a random access memory (RAM), a dynamic RAM (DRAM), a static RAM (SRAM), a synchronous DRAM (SDRAM), and the like), and a non-volatile memory (for example, a read only memory (ROM), a one time programmable ROM (OTPROM), a PROM, an erasable and programmable ROM (EPROM), an electrically EROM (EEPROM), a mask ROM, a flash ROM, a NAND flash memory, an NOR flash memory, and the like).

According to an embodiment of the present disclosure, the internal memory 232 may be a solid state drive (SSD). The external memory 234 may further include a flash drive, for example, a compact flash (CF), a secure digital (SD), a micro SD (Micro-SD), a mini SD (Mini-SD), an extreme digital (xD), or a memory stick. The external memory 234 may be functionally connected to the electronic device 200 through various interfaces. According to an embodiment of the present disclosure, the electronic device 200 may further include a storage device (or storage medium) such as a hard drive.

The sensor module 240 measures a physical quantity or detects an operation state of the electronic device 200, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, red, green, and blue (RGB) sensor) 240H, a biometric sensor 240I, a temperature/humidity sensor 240J, an illumination (light) sensor 240K, and a ultra violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone (mic) 288) of the electronic device 200 through an input means generating an ultrasonic signal to identify data and can perform wireless recognition. According to an embodiment of the present disclosure, the electronic device 200 receives a user input from an external device (for example, computer or server) connected to the electronic device 200 by using the communication module 220.

The display 260 (for example, display module 160) includes a panel 262, a hologram device 264, and a projector 266. The panel 262 may be, for example, a liquid crystal display (LCD) or an active matrix organic light emitting diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment of the present disclosure, the display 260 may further include a control circuit for controlling the panel 262, the hologram device 264, and the projector 266.

The interface 270 includes, for example, a HDMI 272, a USB 274, an optical interface 276, and a D-subminiature (D-sub) 278. The interface 270 may be included in, for example, the communication module 170 illustrated in FIG. 1. Additionally or alternatively, the interface 290 may include, for example, a mobile high-definition link (MHL) interface, a secure digital (SD) card/multi-media card (MMC), or an infrared data association (IrDA) standard interface.

The audio module 280 bi-directionally converts a sound and an electronic signal. At least some components of the audio module 280 may be included in, for example, the user input module 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment of the present disclosure, the camera module 291 may include one or more image sensors (for example, a front sensor or a back sensor), an image signal processor (ISP) (not shown) or a flash (for example, an LED or xenon lamp).

The power managing module 295 manages power of the electronic device 200. Although not illustrated, the power managing module 295 may include, for example, a power management integrated circuit (PMIC), a charger integrated circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment of the present disclosure, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of digital multimedia broadcasting (DMB), digital video broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
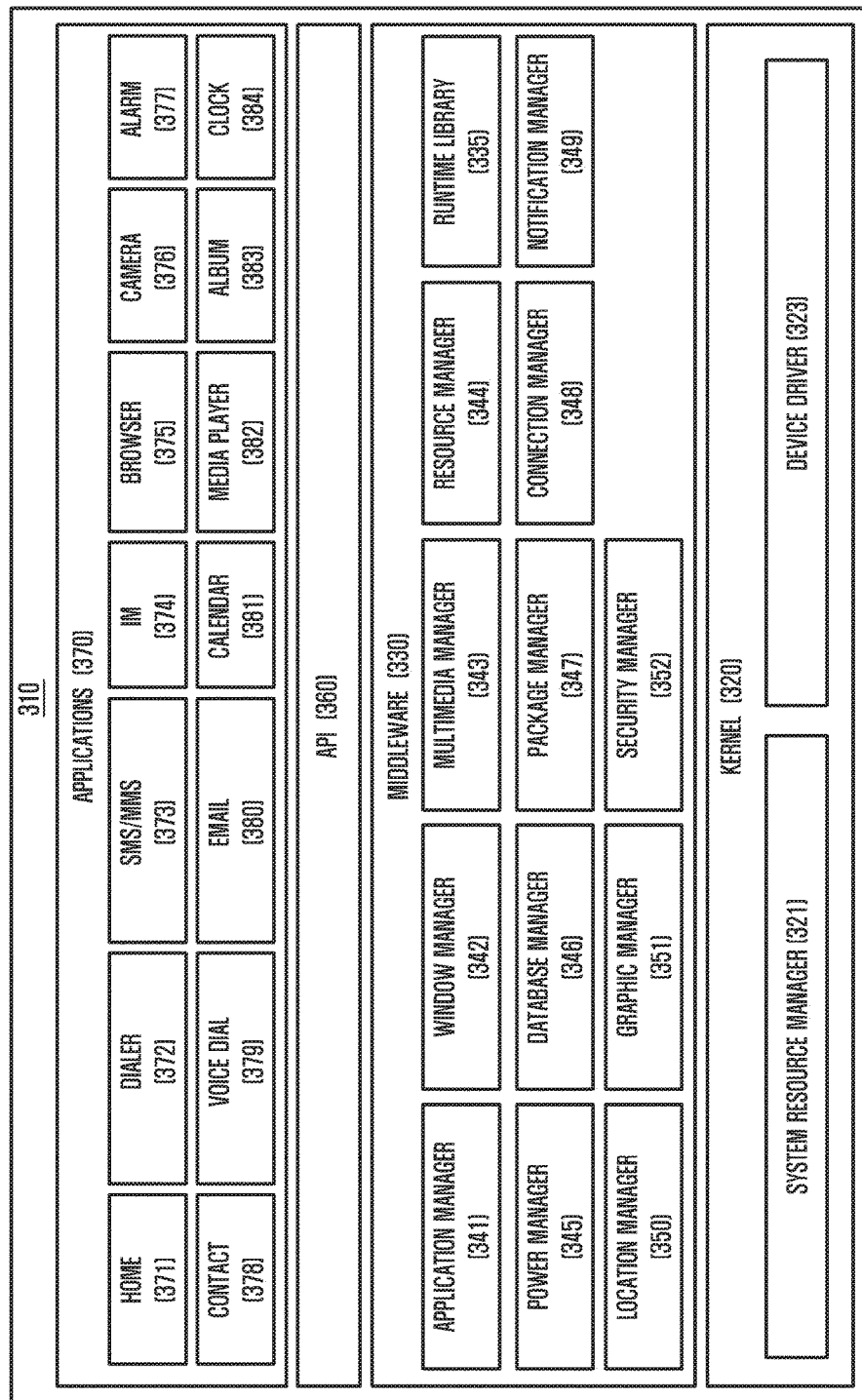
FIG. 3 is a block diagram illustrating a configuration of a program module according to various embodiments of the present disclosure.

FIG. 3 is a block diagram of a programming module 310 according to an embodiment of the present disclosure. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 200) to include an OS controlling resources related to the electronic device (for example, electronic device 100) or various applications (for example, applications 370) driving on the OS. For example, the OS may be Android, iOS, Windows, Symbian, Tizen, Bada or the like.

Referring to FIG. 3, the programming module 310 includes a kernel 320, a middleware 330, an API 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a BT driver, a shared memory driver, a USB driver, a keypad driver, a Wi-Fi driver, and an audio driver. Further, according to an embodiment of the present disclosure, the device driver 323 may include an inter-process communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 300 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment of the present disclosure, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a basic input/output system (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as Wi-Fi or BT. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment of the present disclosure, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of OS to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an OS. For example, in Android or iOS, a single API set may be provided for each platform. In Tizen, two or more API sets may be provided. The applications 370, which may include an application similar to the application 134, may include, for example, a preloaded application and/or a third party application. The applications 370 may include a home application 371 a dialer application 372, a SMS/multlimedia messaging service MMS application 373, an instant messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4A:
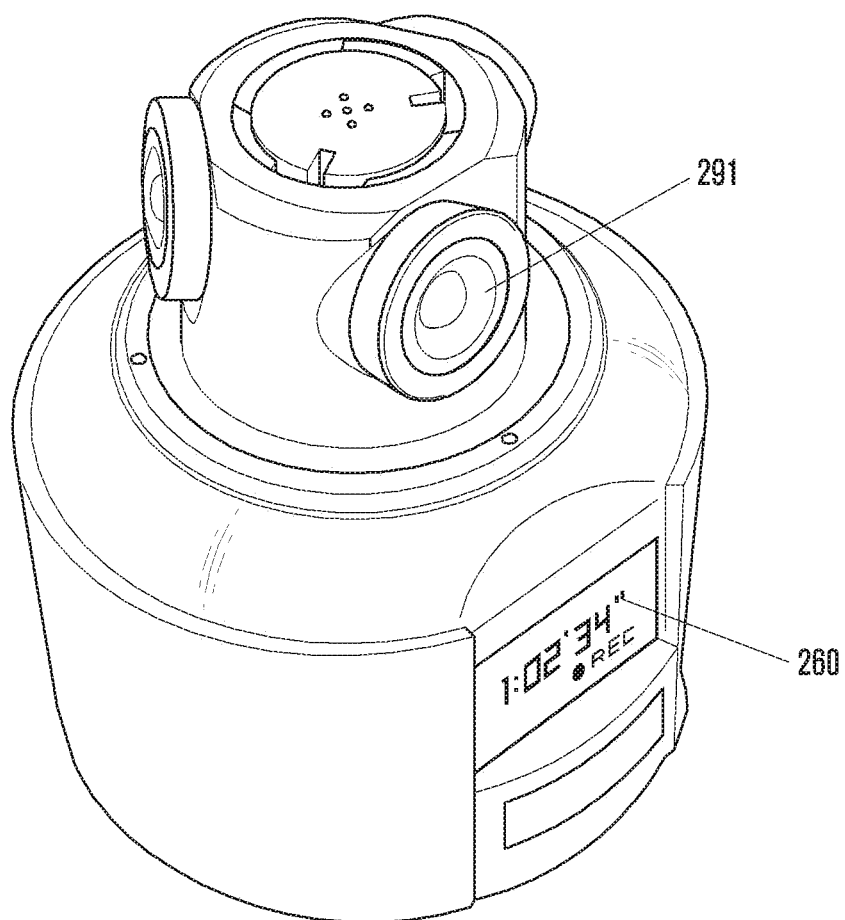
FIG. 4A is a perspective drawing illustrating an electronic device according to various embodiments of the present disclosure.

FIG. 4A is a perspective drawing illustrating an electronic device 200 according to various embodiments of the present disclosure.

Referring to FIG. 4A, the electronic device 200 can be connected functionally to a display 260 and a camera module 291. The display 260 can display a setting state of the camera module 291. The display 260 can provide a user interface for changing settings of the camera module 291. If the display 260 includes a touch detection device, the display 260 can receive a user input. The electronic device 200 can change the settings of the camera module 291 according to the user input received through an input device or the display 260.

The camera module 291 may include at least one lens. The camera module 291 can perform omnidirectional (360 degree) photographing of the surroundings of the electronic device 200 through the at least one lens. For example, if the camera module 291 includes a lens, the omnidirectional (360 degree) photographing of the surroundings of the electronic device 200 can be performed by using the lens, and if the camera module 291 includes two lenses having a view angle greater than 180 degree, the omnidirectional photographing of the surroundings of the electronic device 200 can be performed by using the two lenses Similarly, if the camera module 291 includes three lenses having a view angle greater than 120 degree, the omnidirectional photographing of the surroundings of the electronic device 200 can be performed by using the three lenses. At least one lens may have a view angle of 360 degree divided by a number of lenses included in the electronic device 200.

Figure 4B:
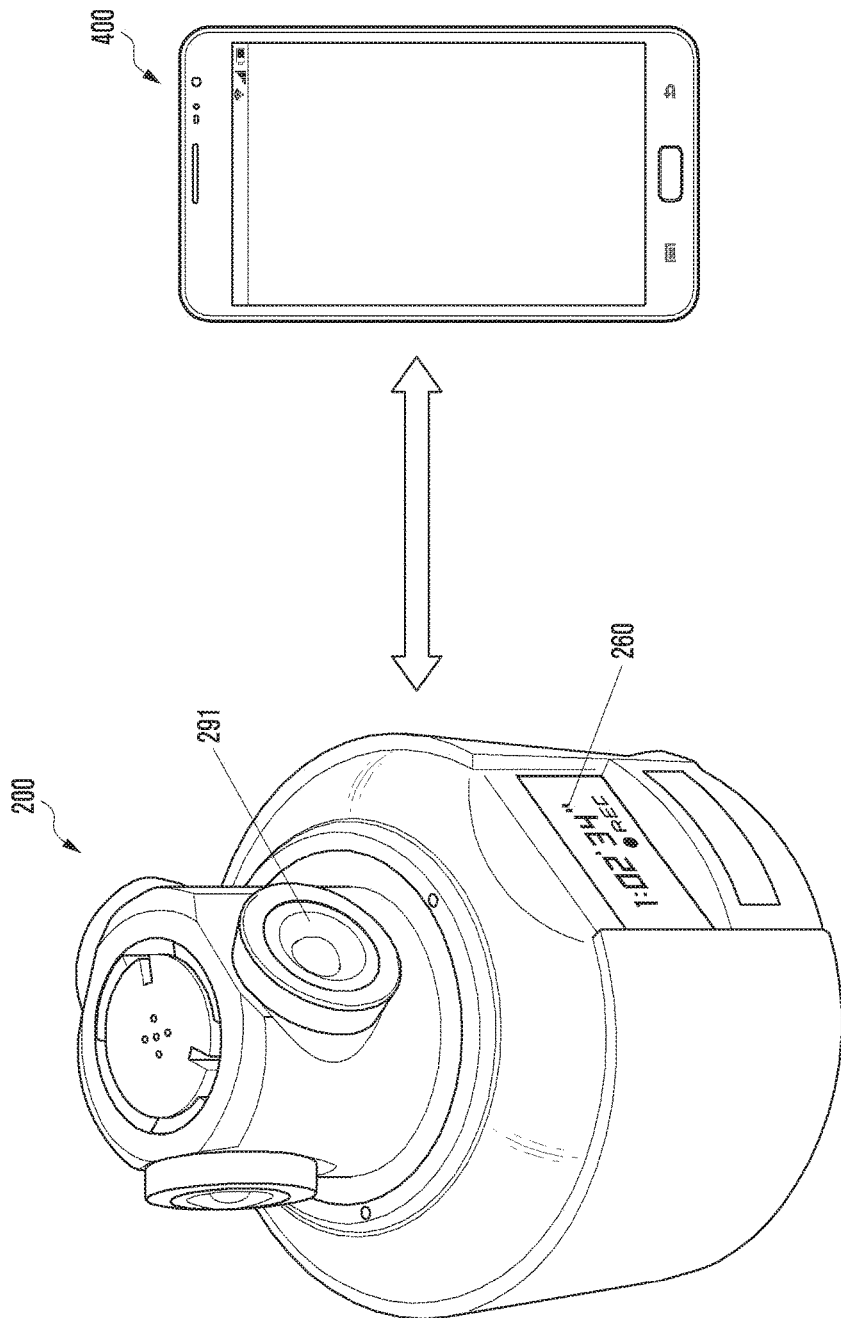
FIG. 4B is a perspective drawing illustrating an electronic device and another electronic device connected through a communication network according to various embodiments of the present disclosure.

FIG. 4B is a perspective drawing illustrating an electronic device 200 and another electronic device 400 connected through a communication network according to various embodiments of the present disclosure.

FIG. 4C is a perspective drawing illustrating an electronic device 200 and another electronic device 400 connected electrically according to various embodiments of the present disclosure.

The electronic device 200 can be connected functionally to a display 260 and a camera module 291. The camera module 291 may include at least one lens. The camera module 291 can perform omnidirectional (360 degree) photographing of the surroundings of the electronic device 200 through the at least one lens.

The electronic device 200 can be connected electrically to the other electronic device 400 or connected through a communication network. For example, the other electronic device 400 may be mobile equipment such as a smartphone, laptop, and tablet PC. The electronic device 200 may be connected electrically to the other electronic device 400 through a cable 401 or connected to another electronic device through wireless communication such as a local area network (LAN).

In order to control the electronic device 200, the other electronic device 400 may include a display configured to display a user interface, wireless communication module configured to exchange data with the electronic device 200; an interface configured to exchange data with the electronic device 200 through the cable 401; input device or touch detection device configured to receive a user input; and a processor configured to process the user input, data exchanged with the electronic device 200, and control signals for the electronic device 200.

The other electronic device 400 can control operations of the electronic device 200 if the electronic device 200 is connected electrically or connected through a communication network.

The other electronic device 400 can display information related to at least one photographing module included in the electronic device 200 in a display. The information displayed in the display of the other electronic device 400 related to the at least one photographing module included in the electronic device 200 may be setting information of the photographing module including a driving state and a photographing parameter. The photographing parameter may be a resolution or a frame rate of an image.

The other electronic device 400 can receive a user input through an input device or a touch detection device included in the other electronic device 400.

The other electronic device 400 can change information related to at least one photographing module included in the other electronic device 200 according to the received user input. For example, the other electronic device 400 can change setting information related to at least one photographing module included in the electronic device 200 according to the received user input.

A driving state (for example, an on/off state) of at least one photographing module included in the electronic device 200 can be displayed through a user interface of a display. The other electronic device 400 can display a user interface for setting information such as driving states of each photographing module, resolution, and frame rate (unit: fps (frame/second)).

The other electronic device 400 can change setting information of the photographing module included in the electronic device 200 according to a user input. For example, according to the user input, a first photographing module (Lens #1) included in the electronic device 200 can be changed from a switched-off state to a switched-on state, a resolution of the first photographing module (Lens #1) can be changed from 720p (720 lines progressive) to 1080p (1080 lines progressive) while photographing, and a frame rate of the first photographing module (Lens #1) included in the electronic device 200 can be changed from 30 fps to 60 fps.

Figure 5:
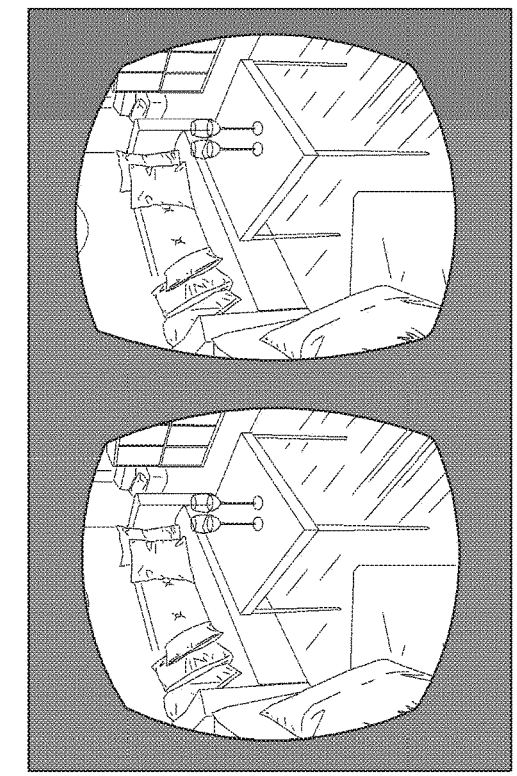
FIG. 5 is a perspective drawing illustrating a head-mounted device (HMD) connected functionally to an electronic device, and an image transmitted from the electronic device, according to various embodiments of the present disclosure.
Figure 5:

FIG. 5 is a schematic drawing illustrating an electronic device 200 and a HMD 510 connected functionally, and an image transmitted from the electronic device 200, according to various embodiments of the present disclosure.

Referring to FIG. 5, for reference number 501, the electronic device 200 can be connected functionally to a HMD 510. The electronic device 200 can transmit a photographed image to the HMD 510 in real time through a communication module 220, and a user can see the transmitted image through the HMD 510. The electronic device 200 can store the photographed image in a memory 230 and transmit the photographed image to the HMD 510 in real time through the communication module 220 at a predetermined time or when the user requests.

Reference number 502 shows an image transmitted from the electronic device 200 while the user is wearing the HMD 510 device. If the user moves a viewpoint, the image photographed by the electronic device 200 can be displayed in the HMD 510 according to a viewpoint movement. For example, if the user turns the head in a state of wearing the HMD 510, the HMD 510 can display an image at a position corresponding to the movement direction of the user's head.

The image photographed by the electronic device 200 may be at least one of an actual image taken from an external environment, image converted to a virtual reality from the actual image, or image of an augmented reality added to the actual image.

Figure 6:
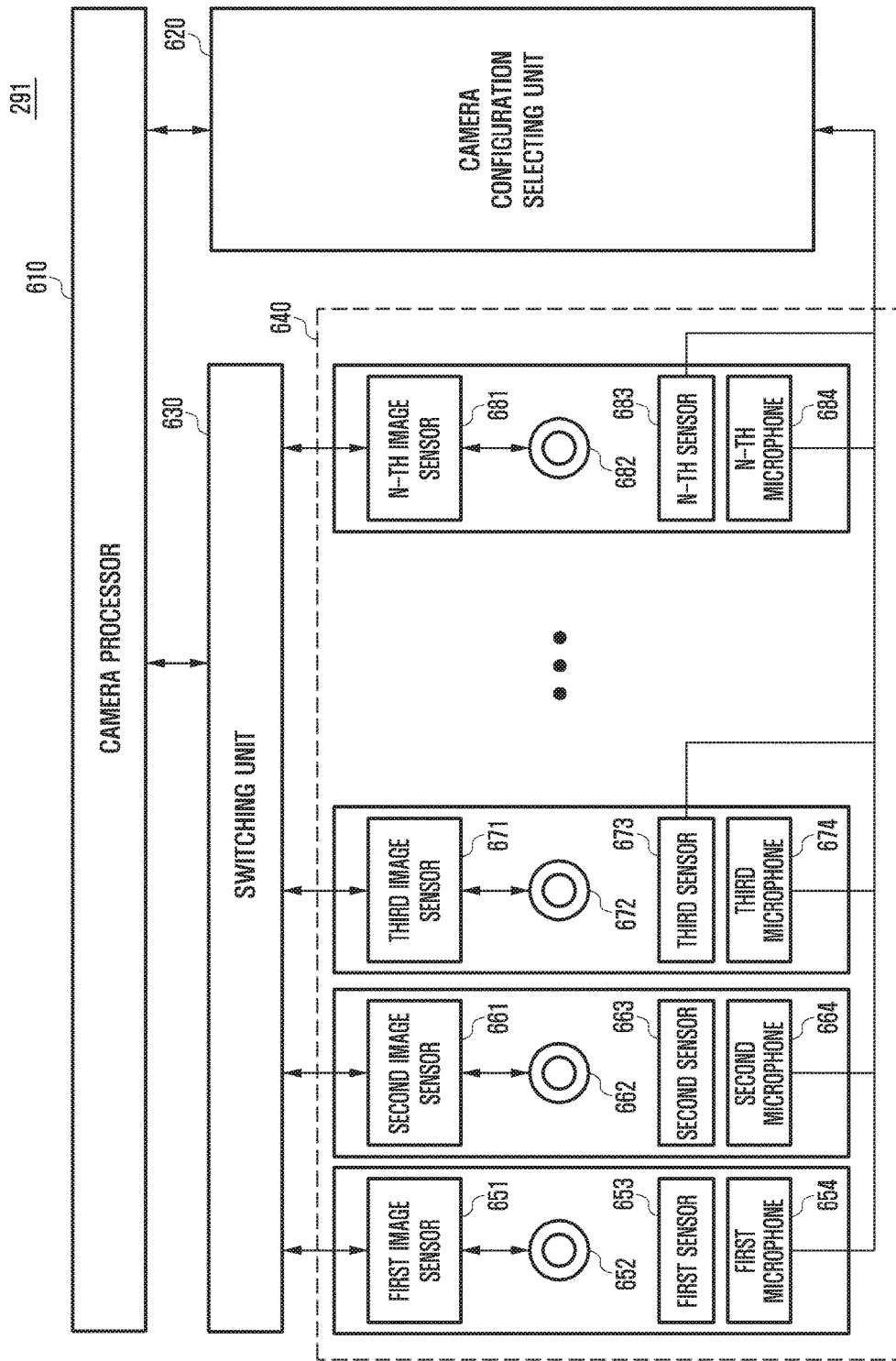
FIG. 6 is a block diagram illustrating a configuration of a camera according to various embodiments of the present disclosure.

FIG. 6 is a block diagram illustrating a configuration of a camera module 291 according to various embodiments of the present disclosure.

Referring to FIG. 6, the camera module 291 may include a camera processor 610, camera configuration selecting unit 620, switching unit 630, and photographing module set 640. The photographing module set 640 may include at least one photographing module. Each photographing module may include an image sensor, lens, sensor, and microphone. A first photographing module 650 may include a first image sensor 651, first lens 652, first sensor 653, and first microphone 654. A second photographing module 660 may include a second image sensor 661, second lens 662, second sensor 663, and second microphone 664. A third photographing module 670 may include a third image sensor 671, third lens 672, third sensor 673, and third microphone 674. An n-th photographing module 680 may include an n-th image sensor 681, n-th lens 682, n-th sensor 683, and n-th microphone 684. Here, n is a natural number greater than 3. The camera module 291 may further include a stitch engine for combining images taken with different settings through a plurality of photographing modules. In various embodiments of the present disclosure, the stitch engine may be software included in the camera processor 610. Alternatively, the stitch engine may be hardware included in the camera module 291.

Each of photographing modules 650, 660, 670, and 680 can detect and collect environment information such as a sound through microphones 654, 664, 674, and 684 included in the photographing module.

Each of photographing modules 650, 660, 670, and 680 can detect and collect environment information such as a movement of a subject through each of sensors 652, 662, 672, and 682 or each of image sensors 651, 661, 671, and 681 included in the photographing module.

Each of photographing modules 650, 660, 670, and 680 can detect and collect environment information such as a movement direction of a user through each of sensors 652, 662, 672, and 682 or each of image sensors 651, 661, 671, and 681 of the photographing module.

Each of sensors 652, 662, 672, and 682 may be a passive IR (PIR) sensor, proximity sensor 240G, gyro sensor 240B, acceleration sensor 240E, ultrasonic sensor, and microwave sensor included in the sensor module 240.

Environment information such as a direction of a sound source, movement of a subject, or movement of a user can be collected through each of microphones 654, 664, 674, and 684; each of sensors 652, 662, 672, and 682; and each of image sensors 651, 661, 671, and 681 included in the photographing modules 650, 660, 670, and 680. The collected result can be transmitted to the camera configuration selecting unit 620. The image sensors 651, 661, 671, and 681 can detect a color change in a subject being photographed, and the electronic device 200 can identify a movement of a user or a movement of a subject in a specific direction according to the color change.

For example, a priority of photographing can be given to one of the photographing modules 650, 660, 670, and 680 generating the highest sound level in a specific direction by comparing the levels of detected sounds. Alternatively, a priority of photographing can be given to one of the photographing modules 650, 660, 670, and 680 including a voice of a specific person or a specific word in a direction of a detected sound. For this, each of microphones 654, 664, 674, 684 may have a directional property, and the electronic device 200 may pre-store a voice of a specific person or a specific word. The electronic device 200 can identify whether a sound level in an area is higher than other areas or whether a voice of a specific person or a specific word is included in a sound collected through the microphones 654, 664, 674, and 684 by using the processor 120, AP 210, or camera configuration selecting unit 620.

In relation to the movement of a subject, a priority of photographing can be given to one of the photographing modules 650, 660, 670, and 680 which detected a specific object. For this, characteristics of the specific object can be pre-stored. The electronic device 200 can identify whether the characteristics of the specific object are included in the subject detected through the sensors 652, 662, 672, and 682 or image sensors 651, 661, 671, and 681 by using the processor 120, AP 210, or camera configuration selecting unit 620.

According to an embodiment of the present disclosure, in relation to the movement of a subject, a priority of photographing can be given to one of the photographing modules 650, 660, 670, and 680 which detected a movement of a subject. By using the processor 120, AP 210, or camera configuration selecting unit 620, the electronic device 200 can identify a movement direction of a subject captured through the photographing modules 650, 660, 670, and 680 by identifying movement directions of a subject detected through the sensors 652, 662, 672, and 682 or image sensors 651, 661, 671, and 681. In an embodiment of the present disclosure, a priority of photographing can be given to one of the photographing modules 650, 660, 670, and 680 which detected a bigger movement of the subject in a specific direction.

In relation to the movement of a user, a priority of photographing can be given to one of the photographing modules 650, 660, 670, and 680 according to a detected movement direction of a user. If the user moves, a priority of photographing can be given to one of the photographing modules 650, 660, 670, and 680 which corresponds to the forward direction of the user's movement image. The photographing modules 650, 660, 670, and 680 corresponding to the forward direction of the user's movement can take an image in a high resolution and the photographing module 650, 660, 670, and 680 not corresponding to the forward direction of the user's movement can take an image in a lower resolution. The electronic device 200 can identify the movement direction of the user based on movement information detected through the sensors 652, 662, 672, and 682 or the image sensors 651, 661, 671, and 681 by using the processor 120, AP 210, or camera configuration selecting unit 620.

The camera configuration selecting unit 620 can decide setting information such as a driving state of the photographing modules 650, 660, 670, and 680 included in the photographing module set 640 and photographing parameters based on the detected environment information and user's camera setting values. The photographing parameter may be a resolution or a frame rate of an image obtained through each photographing module.

The camera configuration selecting unit 620 can transmit the setting information of the photographing modules 650, 660, 670, and 680 to the camera processor 610. The camera processor 610 may be identical to the processor 120 or the AP 210. The camera processor 610 can control the switching unit 630 based on the setting information transmitted from the camera configuration selecting unit 620 and change a driving state and a photographing parameter of each photographing module 650, 660, 670, or 680 based on the transmitted setting information. In various embodiments of the present disclosure, the camera processor 610 and the camera configuration selecting unit 620 can be combined into an element. Further, the camera processor 610, camera configuration selecting unit 620, and switching unit 630 can be combined into an element.

Each of the photographing modules 650, 660, 670, and 680 can take an image from an external environment by controlling each of the lenses 652, 662, 672, and 682 according to a driving state and a photographing parameter set by the camera processor 610 and transmit the taken image to the camera processor 610 after processing through the image sensors 651, 661, 671, and 681.

Figure 7:
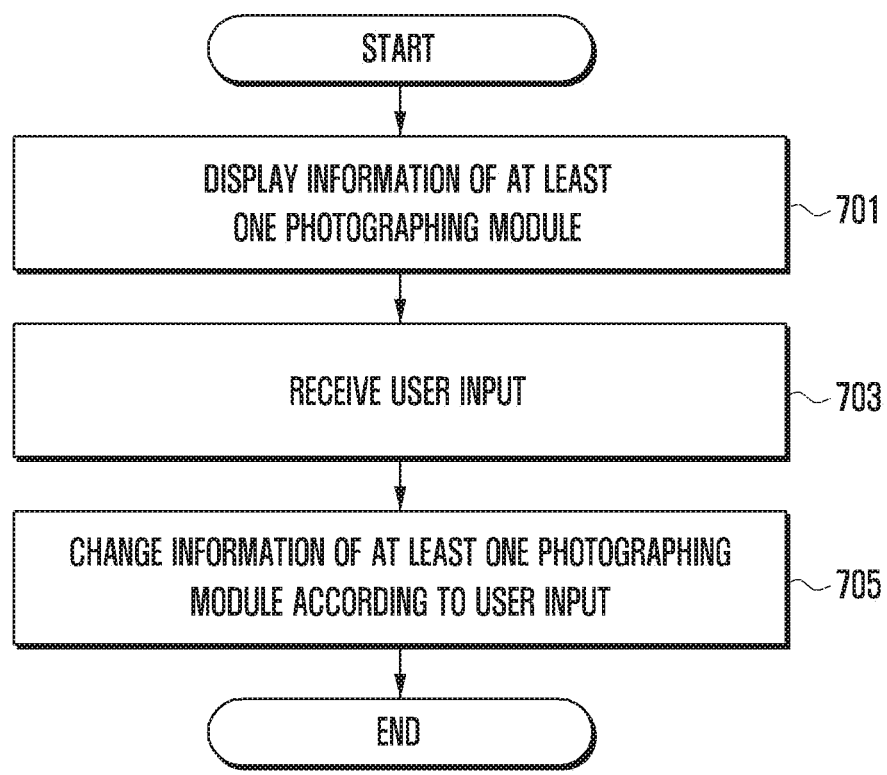
FIG. 7 is a flowchart illustrating a method for setting a camera according to various embodiments of the present disclosure.

FIG. 7 is a flowchart illustrating a method for setting a camera according to various embodiments of the present disclosure.

Referring to FIG. 7, the electronic device 200 displays information of at least one photographing module in a functionally connected display 260 at operation 701. The information of at least one photographing module may include a driving state and a photographing parameter of a photographing module. The photographing parameter may be a resolution or a frame rate of an image obtained through each photographing module.

The electronic device 200 receives a user input signal through the display 260 having an input device or a touch detection device at operation 703.

The electronic device 200 can change information of at least one photographing module according to the received user input signal at operation 705.

Figure 8:
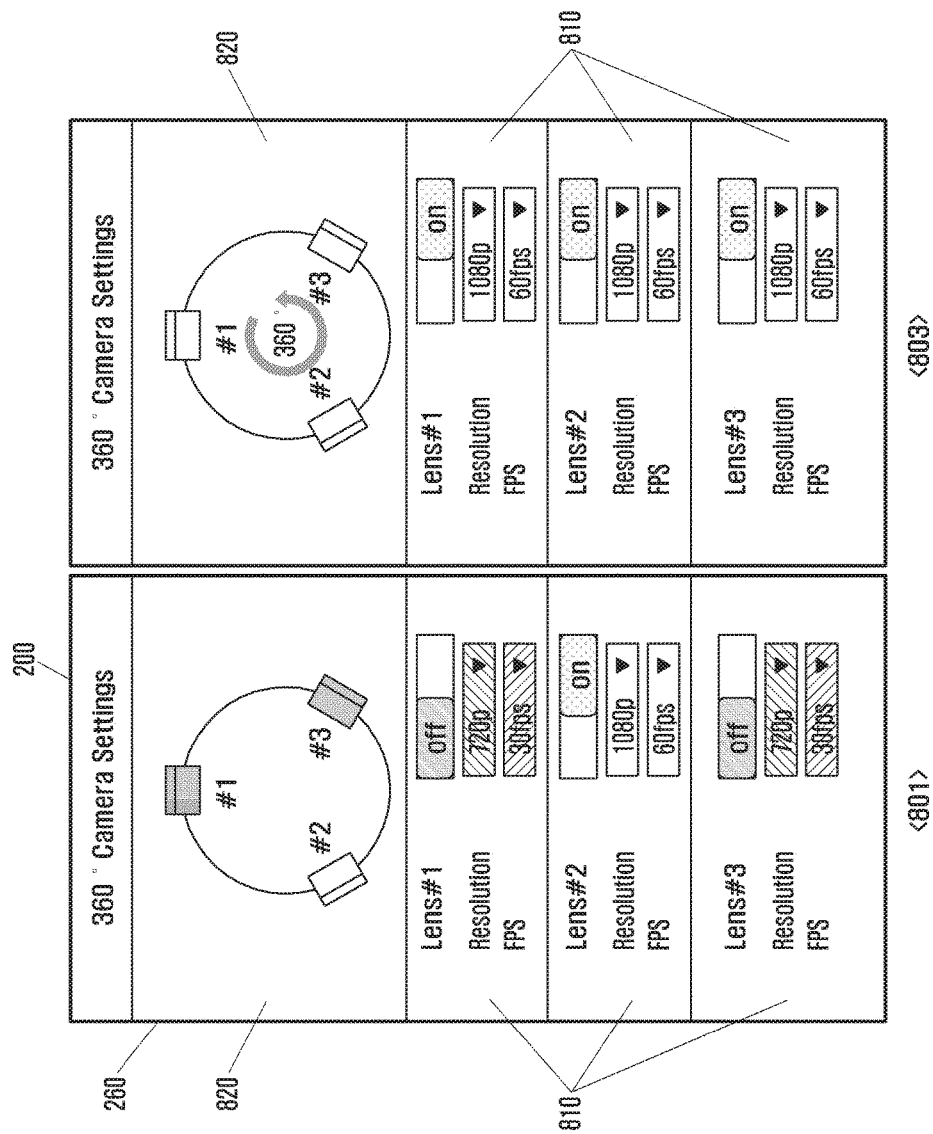
FIG. 8 is a drawing illustrating a user interface according to the method for setting a camera of FIG. 7 according to various embodiments of the present disclosure.

FIG. 8 is a drawing illustrating a user interface according to the method for setting a camera of FIG. 7 according to various embodiments of the present disclosure.

Referring to FIG. 8, for reference number 801, the electronic device 200 can display a driving state (for example, an on/off state) of at least one photographing module in a user interface 810 or 820. The user interface 810 can display not only the driving state of each photographing module but also information such as a resolution and a frame rate. For example, in reference <801>, Lens #1 is set to driving state "off," resolution "720p," and FPS "300 fps."

The user interface 820 indicating a driving state of each photographing module may be displayed in the display 260 of the electronic device 200. For example, in reference <803>it is displayed that each of Lens #1, Lens #2, and Lens #3 is in driving state "on," and that the three lenses collectively provide 360 degree coverage. In another embodiment of the present disclosure, the driving state of at least one photographing module displayed in the user interface 820 of the electronic device 200 can be transmitted to the other electronic device 400 of FIGS. 4B and 4C connected electrically via a connector 401 or connected through a communication network, and the other electronic device 400 can display the driving state in its display.

For reference number 803, setting information of the photographing module can be changed according to a user input. For example, a first photographing module (Lens #1) can be changed from a switched-off state to a switched-on state according to the user input, a photographing resolution can be changed from 720p to 1080p while taking an image with the first photographing module (Lens #1), and a frame rate can be changed from 30 fps to 60 fps while taking an image with the first photographing module (Lens #1) according to the user input.

In an embodiment of the present disclosure, the other electronic device 400 of FIGS. 4B and 4C connected through a communication network or electrically via a connector 401 to electronic device 200 can receive a user input and change setting information of a photographing module according to the user input.

Figure 9:
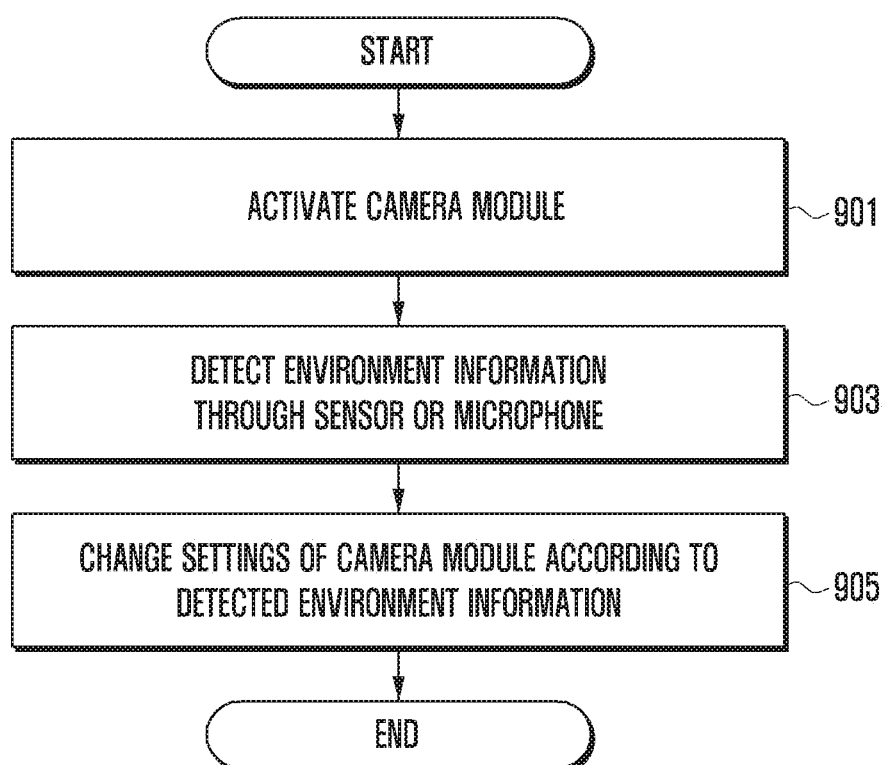
FIG. 9 is a flowchart illustrating a method for setting a camera according to various embodiments of the present disclosure.

FIG. 9 is a flowchart illustrating a method for setting a camera according to various embodiments of the present disclosure.

Referring to FIG. 9, the electronic device 200 activates a camera module 291 at operation 901. If the camera module 291 is activated, the electronic device 200 can detect environment information such as a sound, movement of a subject, and movement of a user through microphones 654, 664, 674, and 684 and sensors 652, 662, 672, and 682 of photographing modules 650, 660, 670, and 680 included in the camera module 291 at operation 903.

The electronic device 200 changes setting information of the camera module 291 according to the detected environment information at operation 905. Environment information such as a sound or a movement of a subject detected through the microphones 654, 664, 674, and 684 and the sensors 652, 662, 672, and 682 is transmitted to the camera configuration selecting unit 620, and the camera configuration selecting unit 620 can decide setting information such as a driving state and a photographing parameter of the photographing modules 650, 660, 670, and 680 included in the photographing module set 640 based on the detected environment information and user's camera setting values. The camera processor 610 can control the switching unit 630 based on the setting information transmitted from the camera configuration selecting unit 620, and the driving state and photographing parameter of each photographing modules 650, 660, 670, or 680 can be changed.

Figure 10:
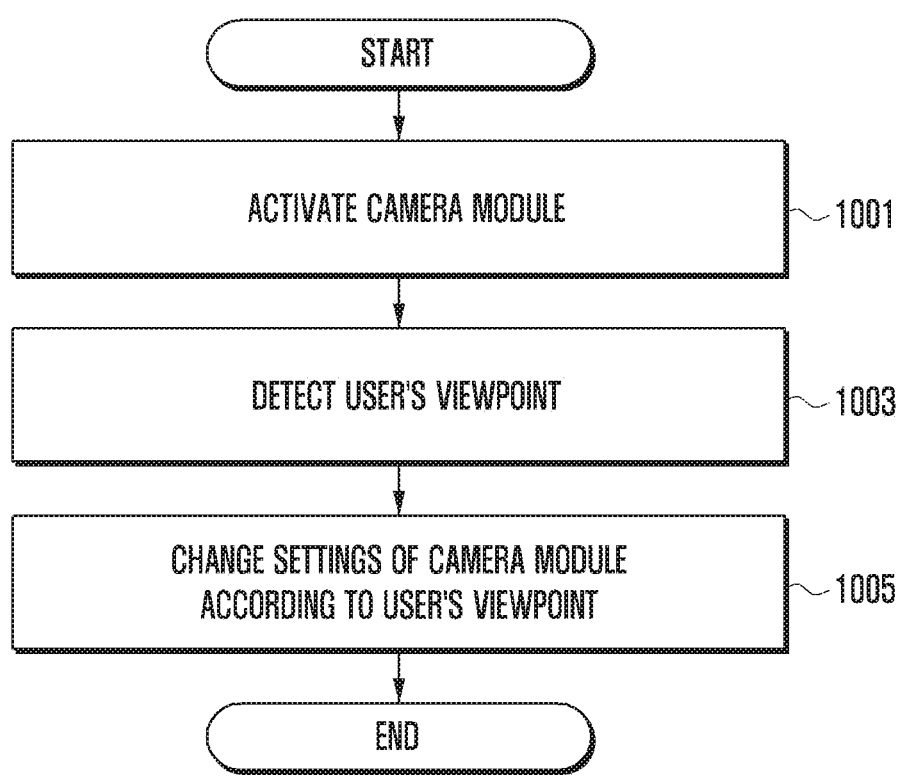
FIG. 10 is a flowchart illustrating a method for setting a camera according to various embodiments of the present disclosure.

FIG. 10 is a flowchart illustrating a method for setting a camera according to various embodiments of the present disclosure.

Referring to FIG. 10, the electronic device 200 activates a camera module 291 at operation 1001. If the camera module 291 is activated, the electronic device 200 detects a user's viewpoint of a functionally connected HMD 510 at operation 1003. In various embodiments of the present disclosure, the HMD 510 connected functionally to the electronic device 200 can transmit information related to the user's viewpoint to the electronic device 200 through a communication module included in the HMD 510, and the electronic device 200 can detect the user's viewpoint according to the transmitted information.

The electronic device 200 changes setting information of the camera module 291 according to the detected user's viewpoint at operation 1005. For example, a photographing module from at least one of the photographing modules 650, 660, 670, and 680 which has a direction identical to the user's viewpoint can be switched on, and other photographing modules having a direction not identical to the user's viewpoint can be switched off. Alternatively, a photographing module from at least one photographing module 650, 660, 670, and 680 which has a direction identical to the user's viewpoint can have a higher resolution or frame rate than other photographing modules having a direction not identical to the user's viewpoint.

Figure 11:
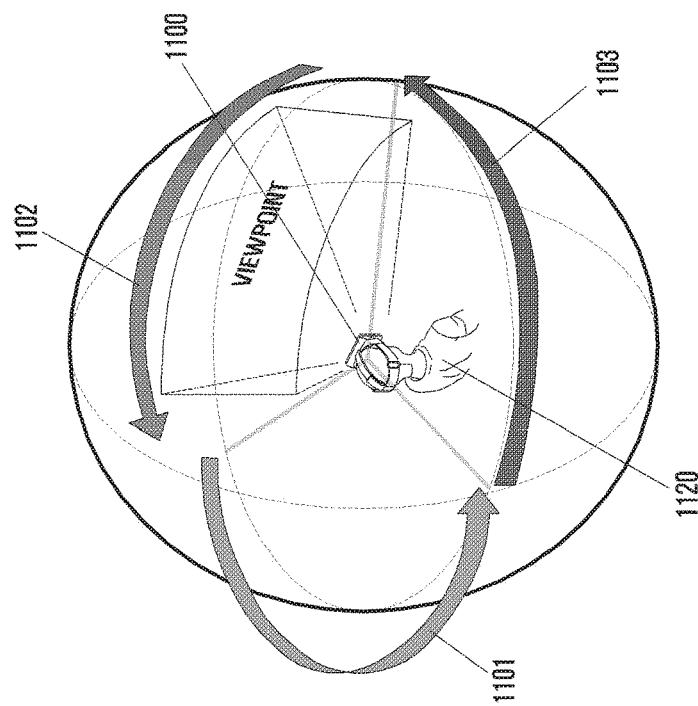
FIG. 11 is a perspective drawing illustrating an electronic device and operations of setting a camera according to the method for setting a camera of FIG. 10.
Figure 11:
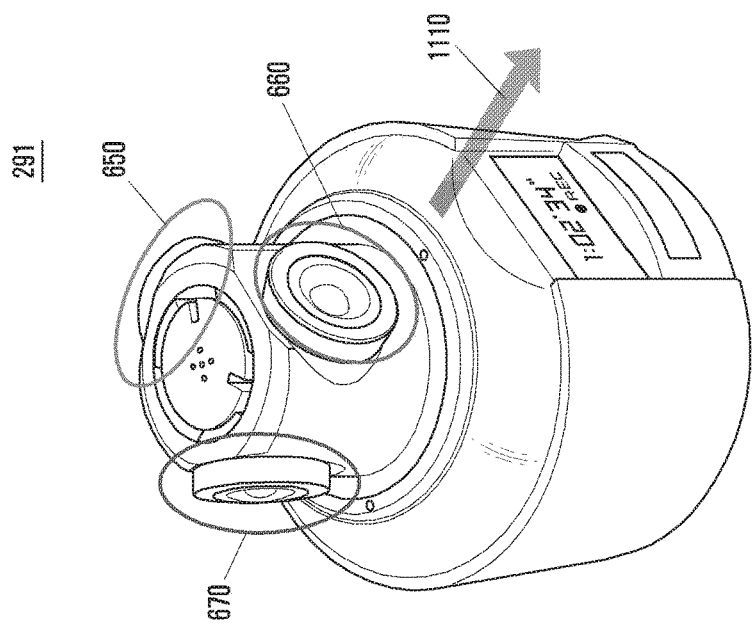

FIG. 11 is a schematic drawing illustrating operations of setting a camera in an HMD 1100 according to the method for setting a camera of FIG. 10. If a user 1120's viewpoint 1110 is detected from the photographing modules 650, 660, and 670 in a direction identical to the second photographing module 660, the electronic device 200 obtains only the screen 1102 from the camera module 291, which has a direction identical to the user 1120's viewpoint 1110, and may not obtain the remaining screens 1101 and 1103.

Referring to FIG. 11, a user 1120's viewpoint 1110 is detected from the photographing modules 650, 660, and 670 in a direction identical to the second photographing module 660, and the electronic device 200 can set a resolution and a frame rate of the screen 1102, which has a direction identical to the user 1120's viewpoint 1110, higher than the remaining screens 1101 and 1103.

An apparatus and a method for setting a camera according to various embodiments of the present disclosure provides advantages of performing an omnidirectional photographing operation by using at least one lens and performing a partial photographing operation for an area desired by a user.

The apparatus and a method for setting a camera according to various embodiments of the present disclosure provides an advantage of setting a photographing quality for each image obtained through at least one lens.

The apparatus and a method for setting a camera according to various embodiments of the present disclosure can provide an effective use time of an electronic device and image storage space for a user by photographing a partial area of an image through omnidirectional photographing While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device, the method comprising:
   detecting environmental information associated with the electronic device using a sensor, wherein the electronic device comprises the sensor, a first image sensor, and a second image sensor;
   changing first setting information of the first image sensor based on the environmental information;
   detecting a user's viewpoint;
   selecting one of the first image sensor or the second image sensor based on the user's viewpoint; and
   changing the first setting information or a second setting information of the second image sensor based on the selected image sensor,
   wherein the detecting of the user's viewpoint comprises:
      receiving orientation information from a head mounted display (HMD); and
      determining the user's viewpoint based on the orientation information.

2. The method of claim 1, further comprising:
   receiving a user input; and
   changing the first setting information based on the user input.

3. The method of claim 2, further comprising displaying the first setting information through a user interface.

4. The method of claim 1, further comprising:
   receiving a user input from another electronic device that is connected to the electronic device; and
   changing the first setting information of the first image sensor based on the user input.

5. The method of claim 1, further comprising assigning a priority to the first image sensor or the second image sensor based on at least one of:
   detecting a subject, identifying whether the subject includes a specific object, and determining a direction of the specific object;
   detecting the subject and determining a direction of movement associated with the subject; or
   detecting a direction of movement of the electronic device.

6. The method of claim 1, wherein the changing of the first setting information comprises:
   when the environmental information is detected in a first area associated with the first image sensor, turning the first image sensor on; and
   when the environmental information is not detected in the first area, turning the first image sensor off.

7. The method of claim 1, wherein the changing of the first setting information comprises, when the environmental information is detected in an area corresponding to the first image sensor, providing a higher photographing quality to the first image sensor and providing a lower photographing quality to the second image sensor.

8. An apparatus comprising:
   a first image sensor;
   a second image sensor;
   a transceiver configured to receive orientation information from a head mounted display (HMD),
   a camera control device configured to:
      detect environmental information associated with the apparatus using a sensor, and
      change first setting information of the first image sensor based on the environmental information; and
   a camera processor configured to:
      control the first image sensor based on the first setting information,
      detect a user's viewpoint based on the orientation information,
      select one of the first image sensor or the second image sensor based on the user's viewpoint, and
      change the first setting information or a second setting information of the second image sensor based on the selected image sensor,
   wherein the camera processor is further configured to determine the user's viewpoint based on the orientation information.

9. The apparatus of claim 8, wherein the camera processor is further configured to continuously synthesize images obtained through the first image sensor and the second image sensor.

10. The apparatus of claim 8, further comprising:
    a touch screen configured to:
       detect a user input, and
       display the first setting information of the first image sensor.

11. The apparatus of claim 10, wherein the camera processor is further configured to change the first setting information based on the user input.

12. The apparatus of claim 8, wherein the camera control device is further configured to assign a priority to the first image sensor or the second image sensor based on one of:
    detecting a subject, identifying whether the subject includes a specific object, and determining a direction of the specific object,
    detecting the subject and determining a direction of movement associated with the subject, or
    detecting a direction of movement of the apparatus.

13. The apparatus of claim 8, wherein, when the camera control device changes the first setting information, the camera control device is further configured to:
    when the environmental information is detected in a first area associated with the first image sensor, turn the first image sensor on, and
    when the environmental information is not detected in the first area, turn the first image sensor off.

14. The apparatus of claim 8, wherein, when the camera control device changes the first setting information, the camera control device is further configured to, when the environmental information is detected in an area corresponding to the first image sensor, provide a higher photographing quality to the first image sensor and provide a lower photographing quality to the second image sensor.

15. The apparatus of claim 8, further comprising:
    a memory configured to store images,
    wherein the transceiver is further configured to:
       transmit the images to the HMD at a predetermined time or in response to a user request.

16. The apparatus of claim 15, wherein the images comprise at least one of an actual image taken from an external environment, an image converted to a virtual reality from the actual image, or an augmented image that includes content added to the actual image.

* * * * *